United States Patent [19]

Goebel et al.

[11] 4,315,060
[45] Feb. 9, 1982

[54] METAL SUBSTRATE FOR AN ELECTROCHEMICAL CELL

[75] Inventors: Franz Goebel, Sudbury; William T. McHugh, Westwood, both of Mass.

[73] Assignee: GTE Products Corporation, Stamford, Conn.

[21] Appl. No.: 159,267

[22] Filed: Jun. 13, 1980

[51] Int. Cl.³ .............................................. H01M 6/00
[52] U.S. Cl. ..................................... 429/122; 429/233
[58] Field of Search ............... 429/153, 122, 209, 233, 429/241, 164, 165; 428/594, 596, 597, 544, 615, 616

[56] References Cited

U.S. PATENT DOCUMENTS

| | | | |
|---|---|---|---|
| 389,455 | 9/1888 | Elliott | 429/241 |
| 3,275,473 | 9/1966 | Barnett et al. | 429/241 X |
| 3,907,593 | 9/1975 | Marincic | 429/218 X |
| 4,052,541 | 10/1977 | von Krusenstierna | 429/241 X |
| 4,189,533 | 2/1980 | Sugalski | 429/241 X |
| 4,237,205 | 12/1980 | Matter | 429/241 X |
| 4,250,235 | 2/1981 | DuPont et al. | 429/24 X |

Primary Examiner—Charles F. LeFevour
Attorney, Agent, or Firm—Peter Xiarhos

[57] ABSTRACT

A metal current collector substrate adapted to be inserted into an elongated cylindrical housing of a primary electrochemical cell. The metal current collector substrate is employed together with porous carbon and fiberglass separator elements to form a carbon current collector electrode/separator assembly for use in the electrochemical cell.

The metal current collector substrate in accordance with the invention comprises a thin, circular, metal disc (e.g., of nickel) having a plurality of curved notches around its periphery. The notches are equally-spaced about the periphery of the disc (e.g., at 45° intervals) and define a plurality of deflective, resilient arcuate portions intermediate to the notches. Prior to insertion into the housing of the cell, the disc is flat and has a diameter greater than the internal diameter of the housing. The disc is inserted into the housing by pushing the disc longitudinally into the housing whereupon the arcuate portions are deflected upwardly by physical contact with the interior wall of the housing. This deflection causes the arcuate portions to move toward each other and in turn to cause the disc to generally conform to the interior cross section of the housing. The arcuate portions following the deflection thereof are at acute angles with respect to the interior wall of the housing and make direct physical contact with the wall of the housing. In addition, due to the adjacency of the notches in the disc to the wall of the housing, a plurality of passageways are established between the disc and the interior wall of the housing.

8 Claims, 6 Drawing Figures

METAL SUBSTRATE FOR AN ELECTROCHEMICAL CELL

CROSS-REFERENCE TO RELATED APPLICATIONS

In co-pending patent application Ser. No. 159,266, filed concurrently herewith in the names of John E. Barnes, Franz Goebel and William T. McHugh, and entitled "INTEGRATED CARBON/INSULATOR STRUCTURE AND METHOD FOR FABRICATING SAME", there is disclosed and claimed an integrated carbon/insulator structure as may be used with a metal current collector substrate as disclosed and claimed in the present application.

In co-pending patent application Ser. No. 159,271, filed concurrently herewith in the names of Franz Goebel and William T. McHugh, and entitled "ELECTROCHEMICAL CELL," there is disclosed and claimed an electrochemical cell employing a plurality of metal current collector substrates as disclosed and claimed in the present application.

BACKGROUND OF THE INVENTION

The present invention relates to a metal substrate for an electrochemical cell and, more particularly, to a metal current collector substrate for a carbon electrode/separator structure for a primary electrochemical cell. The invention also relates to a method for assembling such a substrate into an electrochemical cell.

There are many situations in which it is desirable to utilize a primary electrochemical cell, such as a cylindrical electrochemical cell, in a high-rate, low-temperature application, for example, at a rate greater than 1 $mA/cm^2$ and a temperature to $-40°$ C. The most common design of a high-rate cylindrical primary electrochemical cell includes a combination of an anode, a cathode electrode structure, and a separator. These elements are rolled up together, with the separator being sandwiched between the anode and the cathode electrode structure. A typical implementation of a spiral-wound, or "jelly-roll," structure as described above includes an anode of an oxidizable alkali metal such as lithium (within a supporting metal grid), a cathode electrode structure comprising a metal current collector (e.g., a nickel grid or screen) physically supporting an aggregation of porous carbon globules or conglomerates, and a separator of an electrically-nonconducting material such as fiberglass. These cell components normally are in a form prior to assembly of elongated rectangular strips. The arrangement of cell components as described above is utilized within the cell with a suitable electrolytic solution. A common electrolytic solution for a primary electrochemical cell is a cathodelectrolyte solution including a reducible soluble cathode such as thionyl chloride and an electrolyte solute such as lithium tetrachloroaluminate dissolved in the thionyl chloride. During the discharge of the cell having the abovedescribed components and specific materials, a progressive depletion of the lithium anode takes place as electrochemical reaction occurs within the cell and discharge products are formed. This action is normally accompanied by the generation of a small and tolerable amount of heat in the cell, more particularly, in the region of the cathode structure.

While a cylindrical spiral-wound electrochemical cell as described hereinabove operates in a generally satisfactory manner, the cell is subject to substantial IR (internal resistance) losses due to the lengths of the electrodes. As a result, there is non-uniform and incomplete utilization of the active materials of the cell and, thus, a limitation on the rate of discharge of the cell and the temperature at which the cell will operate in its intended and desired fashion. In addition, the spiral-wound nature of the components of the cell tends to lead to the retention of heat developed, in the cell during discharge of the cell, limiting the degree to which the heat can be effectively dissipated away from the interior of the cell to the outside, specifically, to the metal can or housing of the cell. An excessive buildup of heat within the cell can, in severe cases, lead to extensive physical damage to the cell.

BRIEF SUMMARY OF THE INVENTION

In accordance with the present invention, a metal current collector substrate is provided for use within an elongated housing of an electrochemical cell.

The current collector substrate in accordance with the invention comprises a thin metal disc having a plurality of openings adjacent to its periphery defining a plurality of deflective, resilient peripheral portions intermediate to the openings. The disc is adapted to be inserted into the housing of an electrochemical cell and is normally flat prior to insertion into the housing of the cell and, in addition, has a size prior to insertion into the housing of the cell greater than the interior cross section of the housing. The peripheral portions of the disc are arranged when the disc is inserted into the housing, specifically, by a pushing operation, to be deflected upwardly by physical contact with an interior wall of the housing and to move toward each other thereby to cause the disc to generally conform to the interior cross section of the housing. Following the deflection of the peripheral portions, the peripheral portions are at acute angles with respect to the interior wall of the housing and make direct physical contact with the interior wall of the housing and establish a plurality of passageways adjacent to the interior wall of the housing as a result of the adjacency of the plurality of openings to the interior wall of the housing.

BRIEF DESCRIPTION OF THE DRAWING

Various objects, features and advantages of a metal current collector substrate for an electrochemical cell in accordance with the present invention will be apparent from a detailed discussion taken in conjunction with the accompanying drawing in which.

DETAILED DESCRIPTION OF THE INVENTION

Figure 1:
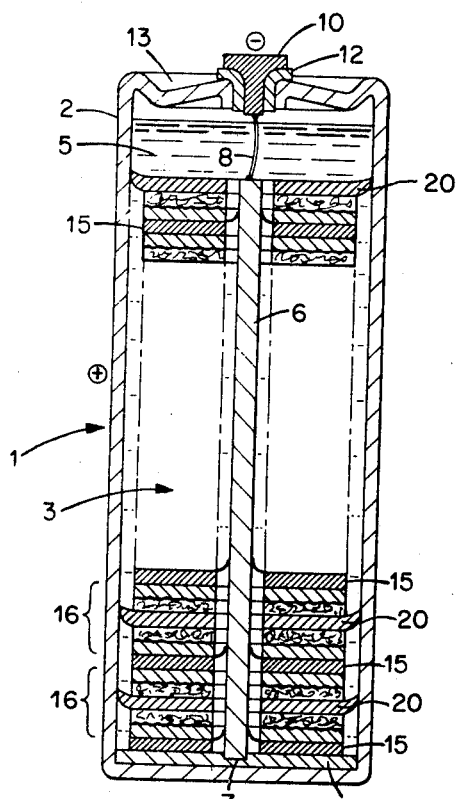
FIG. 1 is an elevational view in cross section of a primary electrochemical cell employing a plurality of metal current collector substrates in accordance with the present invention.

Referring now to FIG. 1, there is shown a primary electrochemical cell 1 employing a plurality of metal current collector substrates 20 in accordance with the present invention. The electrochemical cell 1 as shown in FIG. 1 generally includes a cylindrical metal case or housing 2, for example, of stainless steel, within which a battery stack 3 is disposed and insulated from the metal housing 2 by means of a suitable insulator 4 at a bottom end of the housing. The housing 2 of the cell 1 further includes an electrolytic solution 5 in contact with the battery stack 3. This solution may include a reducible soluble cathode such as thionyl chloride and an electrolyte solute such as lithium tetrachloroaluminate dissolved in the thionyl chloride.

The battery stack 3 as employed within the cell 1 comprises a large number of thin, generally circular, annular-shaped components which are directly superimposed on each other in a vertical stacked array relative to the housing 2 and relative to an elongated, cylindrical, solid, metal rod 6 which extends completely through the battery stack 3 and is encircled by the aforesaid components. The rod 6, which is typically of a metal such as nickel and having a diameter of 0.042 inch, is restrained at its bottom end within a detent 7 in the insulator 4 and connected at its top end by a thin metal strip 8 to a metal terminal 10 of the cell 1. The metal strip 8, which may be of nickel, is typically connected to the rod 6 and to the terminal 10 by spot welds and is connected to the terminal 10 by way of a standard insulative glass or ceramic-to-metal seal 12 provided within an hermetically sealed cap 13 of the cell 1. As will be more readily apparent hereinafter, the rod 6, the metal strip 8 and the terminal 10 collectively represent one of the electrical terminals for the cell 1.

Figure 2:
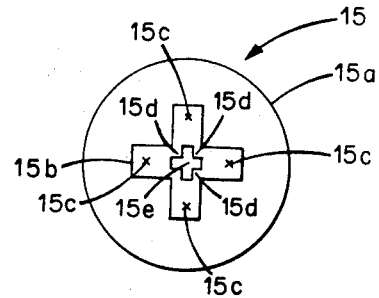
FIGS. 2 and 3 are top and side views, respectively, of an anode structure utilized by the electrochemical cell of FIG. 1.
Figure 3:
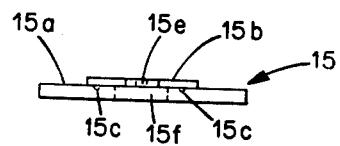
Figure 4:
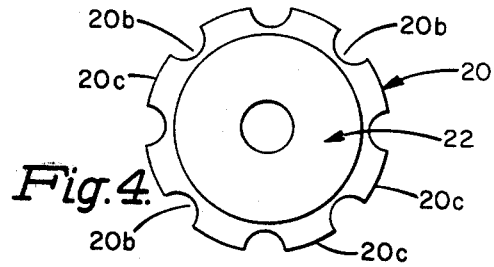
FIGS. 4 and 5 are top and cross-sectional views, respectively, of a carbon current collector electrode/separator assembly utilized by the electrochemical cell of FIG. 1 and including a metal current collector substrate in accordance with the present invention.
Figure 5:
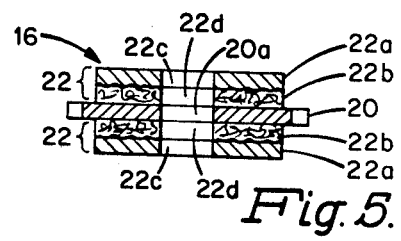

The various stacked components of the battery stack 3 as mentioned hereinabove generally include a plurality of anode structures 15 and a plurality of carbon current collector electrode/separator assemblies 16 arranged in the array in alternation with the anode structures 15. Each of the anode structures 15 has a particular form as shown in FIGS. 2 and 3, and each of the carbon current collector electrode/separator assemblies 16 has a particular form as shown in FIGS. 4 and 5. Each of the carbon collector current electrode/separator assemblies 16 includes a metal current collector substrate 20 of the invention, as will be explained more fully hereinafter.

As indicated in FIGS. 2 and 3, each of the anode structures 15 comprises a thin, flat, generally circular, annular-shaped disc 15a, and a cross-shaped contact member 15b secured to the disc 15a. A suitable material for the disc 15a for use within the cell 1 is an oxidizable alkali metal such as lithium, and a suitable thickness is 0.005–0.006 inch. The cross-shaped contact member 15b, which may be of nickel of a thickness of 0.003–0.005 inch, is secured to the lithium anode disc 15a by means of several small tines or barbs 15c which are stamped into the arms thereof and which "bite" into the soft lithium metal for physical and electrical contact therewith. The contact member 15b further has a plurality of resilient portions 15d which collectively define a cross-shaped opening 15e in the contact member 15b. This opening is aligned with a larger central opening 15f (FIG. 3) in the lithium anode disc 15a. The opening 15e in the contact member 15b has a size as defined by the portions 15d so that the anode structure 15 can be assembled onto the rod 6 by simply forcing the anode structure 15 over the top end of the rod 6 and sliding the anode structure 15 down the rod 6 to its proper position in the stack. When in its proper position in the stack, and as indicated in FIG. 1, the resilient portions 15d of the contact member 15b are deflected upwardly slightly and in direct physical and electrical contact with the rod 6 and, due to the sharp edges of the portions 15d, bite into the rod 6 so as to secure the anode structure 15 in position. As indicated in FIG. 1, the diameter of each anode structure 15 is selected to be smaller than the internal diameter of the housing 2 of the cell 1 so as to establish a space, the purpose of which will be explained hereinafter, between the anode structure 15 and the interior wall of the housing 2. A suitable diameter for the anode structure 15 is 0.850 inch, corresponding to a C-size cell. A typical internal diameter for the housing 2 is 0.960 inch.

Figure 6:
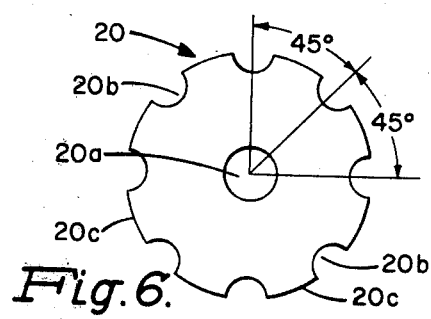
FIG. 6 is a top view of the metal current collector substrate in accordance with the present invention.

Each of the aforementioned carbon current collector electrode/separator assemblies 16 as shown in FIGS. 4 and 5 generally includes a current collector substrate 20 in accordance with the present invention and a pair of integrated carbon/insulator structures 22 on opposite sides of the current collector substrate 20. The integrated carbon/insulator structures 22 as shown in FIGS. 1 and 5, although forming part of the electrode/separator assembly within the cell 1, both physically and actively, are not secured to the current collector substrate 20 but rather are only in direct physical contact with the substrate 20 when assembled into the cell 1. The current collector substrate 20 in accordance with the invention and shown in FIG. 6 takes the form of a generally thin, circular, flat disc of a metal such as nickel having a circular central opening 20a and a plurality of openings in the form of notches 20b equally spaced around its periphery at 45° intervals and defining small arcuate peripheral portions 20c intermediate to the notches. A suitable radius for each of the notches 20b is about 0.047 (3/64) inch. The opening 20a in the substrate 20 is of a diameter greater than the diameter of the rod 6 so as to establish a spacing, and to be electrically isolated from, the rod 6 when the substrate 20 and the associated carbon/insulator structures 22 are assembled together into the cell 1. The purposes of the notches 20b and the arcuate peripheral portions 20c will be explained hereinafter.

Each of the carbon/insulator structures 22 used with the abovedescribed current collector substrate 20 comprises, as shown in FIG. 5, an arrangement of a thin porous insulator sheet or disc 22a physically and permanently integrated with a porous carbon layer or disc 22b. The porous insulator disc 22a is of an electrically-nonconducting material such as fiberglass and serves as a separator for electrically isolating the associated porous carbon disc 22b from an immediately adjacent one of the lithium anode structures 15. The porous carbon disc or layer 22b comprises an aggregation of porous globules or conglomerates containing carbon black and a binder such as "Teflon" and having a network of electrolyte-conducting channels formed throughout its entire mass, the purpose of which will be explained more fully hereinafter. For purposes of assembly within the cell 1, the porous insulator disc 22a and the porous carbon layer 22b have respective circular central openings 22c and 22d of the same size as, and aligned with, the opening 20a in the current collector substrate 20 for providing a space between these elements and the rod 6 when assembled within the cell 1.

Although the integrated carbon/insulator structures 22 as described hereinabove can be fabricated in different ways, a preferred fabrication method is described in detail in the aforementioned co-pending application Ser. No. 159,266 to which reference may be made for specific details. Suitable thicknesses for the porous insulator disc 22a and the porous carbon layer 22b for use in the battery stack as described hereinabove are 0.005 and 0.007 inch, respectively. A suitable thickness for the current collector substrate 20 is 0.003 inch.

The current collector substrate 20 and the associated pair of carbon/insulator structures 22 are assembled relative to the rod 6 by first sliding the lower one of the carbon/insulator structures 22, which has a diameter (e.g., a 0.060) smaller than the internal diameter of the cell 1, over the rod 6 and then placing the current collector substrate 20 on top of the lower carbon/insulator structure 22 (with the carbon layer 22b facing the substrate 20). In this latter operation, and to insure that the current collector substrate 20 is fixed securely in position when assembled into the housing 2 of the cell 1, the current collector substrate 20 is made to have a diameter prior to insertion into the housing 2 which is slightly greater than the internal diameter of the housing 2, for example, a diameter of 0.972 inch as compared with an internal diameter of 0.960 inch for the housing 2. When the current collector substrate 20 is inserted into the cell, specifically, by pushing the substrate 20 longitudinally into the housing 2, the arcuate portions 20c are caused to turn, or be deflected, upwardly slightly by virtue of physical contact with the interior wall of the housing 2. At the same time, the resilient arcuate portions 20d are caused to move slightly toward each other as the substrate 20 conforms to the internal diameter and configuration of the housing 2. The notches 20b at the periphery of the substrate 20 thereby prevent the substrate 20 from being wrinkled or otherwise damaged by virtue of excessive deformation of the substrate. When the substrate 20 has been assembled to its proper and desired position within the stack, the upturned, deflected arcuate portions 20c, by virtue of their sharp edges, bite into the interior wall of the housing 2 in numerous places, as indicated in FIG. 1, so as to secure the substrate 20 in position and establish electrical contact with the housing 2. The deflected portions 20c at this time are at acute angles of about 30° degrees with respect to the interior wall of the housing 2. Once the substrate 20 has been assembled into the cell 1 as described hereinabove, the upper one of the carbon/insulator structures 22 can be readily positioned on top of and in direct physical contact with the substrate 20 (with the carbon layer 22b facing the substrate 20). It will be apparent from the above discussion, therefore, and by reference to FIG. 1, that the combined effects of the multiple substrates 20 gripping onto the housing 2 in numerous places and the multiple contact members 15b of the anode structures 15 gripping onto the rod 6 in numerous places results in a battery stack 3 which is fixed in position within the housing 2. In a typical construction of the battery stack 3 as described hereinabove, twenty anode structures 15 and carbon collector current electrode/separator assemblies 16 can be assembled into a cell of a height approximately equal to the height of one-half of a standard C-size cell.

With the abovedescribed battery stack 3 assembled within the cell 1 as discussed hereinabove, the electrolytic solution 5 (e.g., cathodelectrolyte solution) is readily able to diffuse into the stack and permeate the porous components thereof. The flow of the electrolytic solution 5 to the components of the stack is facilitated by the aforedescribed numerous notches 20b formed in the current collector substrates 20 and adjacent to the interior wall of the housing 2 and by the spacings established between the components of the stack and the interior wall of the housing 2 and the rod 6. This electrolytic solution 5 diffuses into the multiple carbon discs 22b by way of the network of electrolyte-conducting channels formed therein and also diffuses into the multiple porous discs 22a. The physical and electrical connection of the multiple anode structures 15 to the rod 6 establishes the rod 6 and the metal strip 8 and the terminal 10 connected therewith as the negative terminal of the cell 1. The physical and electrical connection of the multiple substrates 20 to the interior wall of the housing 2 establishes the housing 2 as the positive terminal of the cell 1.

The provision in the cell of multiple anode structures 15 as described above makes a large surface area of lithium available per unit volume for electrochemical reaction in the cell during discharge of the cell. As this electrochemical action takes place, the lithium is progressively depleted (from the outside to the inside of the cell) and, at the expiration of the rated life span of the cell, is essentially completely depleted. This action is greatly aided by the small gradient in current density from the outside of the lithium discs to the center. The IR losses are thus very low and the degree of material utilization of the lithium is uniform and very substantial. During the discharge of the cell 1, the multiple substrates 20 electrically contact the interior portions of the associated carbon discs 22b thereby to function collectively as a current collector for the cell 1. By virtue of the short and direct physical and current path lengths of the substrates 20 to the housing 2, heat normally developed during the discharge of the cell 1 is rapidly dissipated through the substrates 20 by thermal conduction to the housing 2. The housing 2 thus acts as a heat sink. The above characteristics and features of the cell 1 thereby renders such cell especially useful in high-rate, low-temperature applications.

The above-described electrochemical cell 1 is also disclosed, and claimed, in the aforementioned co-pending application Ser. No. 159,271.

While there has been described what is considered to be a preferred embodiment of the invention, it will be apparent to those skilled in the art that various changes and modifications may be made therein without departing from the invention as called for in the appended claims.

What is claimed is:

1. A metal current collector substrate adapted to be inserted into an elongated housing of an electrochemical cell and to make direct physical contact with an interior wall of the housing, said current collector substrate comprising:

a thin, solid, resilient disc of a non-permeable metal and having a plurality of like cut-out openings spaced about its entire periphery in a predetermined pattern and defining a plurality of deflective, resilient peripheral portions intermediate to the openings, said disc further having a single additional opening therein spaced from the plurality of other openings and encircled by the material of the disc, and said disc being normally flat prior to insertion into the housing of an electrochemical cell and having a size prior to insertion into the housing of the cell greater than the interior cross section of the housing, by an amount such that the peripheral portions of said disc operate when the disc is inserted into the housing to be deflected upwardly by physical contact with the interior wall of the housing and to move toward each other thereby to cause the disc to generally conform to the interior cross section of the housing, said peripheral portions following the deflection thereof being at acute angles with respect to the interior wall of the housing and making direct physical contact with the interior wall of the housing and establishing a plurality of passageways adjacent to the interior wall of the housing as a result of the adjacency of the plurality of openings to the interior wall of the housing.

2. A current collector substrate in accordance with claim 1 wherein:

the elongated housing into which the substrate is adapted to be inserted has a circular cross section and a predetermined internal diameter; and the metal disc has a generally circular configuration and a diameter prior to insertion into the housing greater than the internal diameter of the housing.

3. A current collector substrate in accordance with claim 2 wherein:

the peripheral openings are in the form of notches of the same size and equally spaced around the periphery of the disc thereby to define arcuate peripheral portions of like size therebetween.

4. A current collector substrate in accordance with claim 3 wherein:

the notches are spaced around the periphery of the disc at 45° intervals.

5. A current collector substrate in accordance with claim 4 wherein:

the metal disc is of nickel.

6. A current collector substrate in accordance with claim 5 wherein:

the nickel disc has a thickness of 0.003 inch.

7. A current collector substrate in accordance with claim 6 wherein:

the elongated housing into which the metallic substrate is adapted to be inserted has a internal diameter of 0.960 inch;

the metal disc has a diameter prior to insertion into the housing of 0.972 inch;

the notches in the disc are circular in configuration and each has a radius of 0.047 inch; and the peripheral portions following insertion of the disc into the housing are at acute angles of about 30° degrees with respect to the interior wall of the housing.

8. A current collector substrate in accordance with claim 7 wherein:

the additional opening of the disc is located centrally in the disc.

* * * * *